United States Patent Office 3,536,981
Patented Oct. 27, 1970

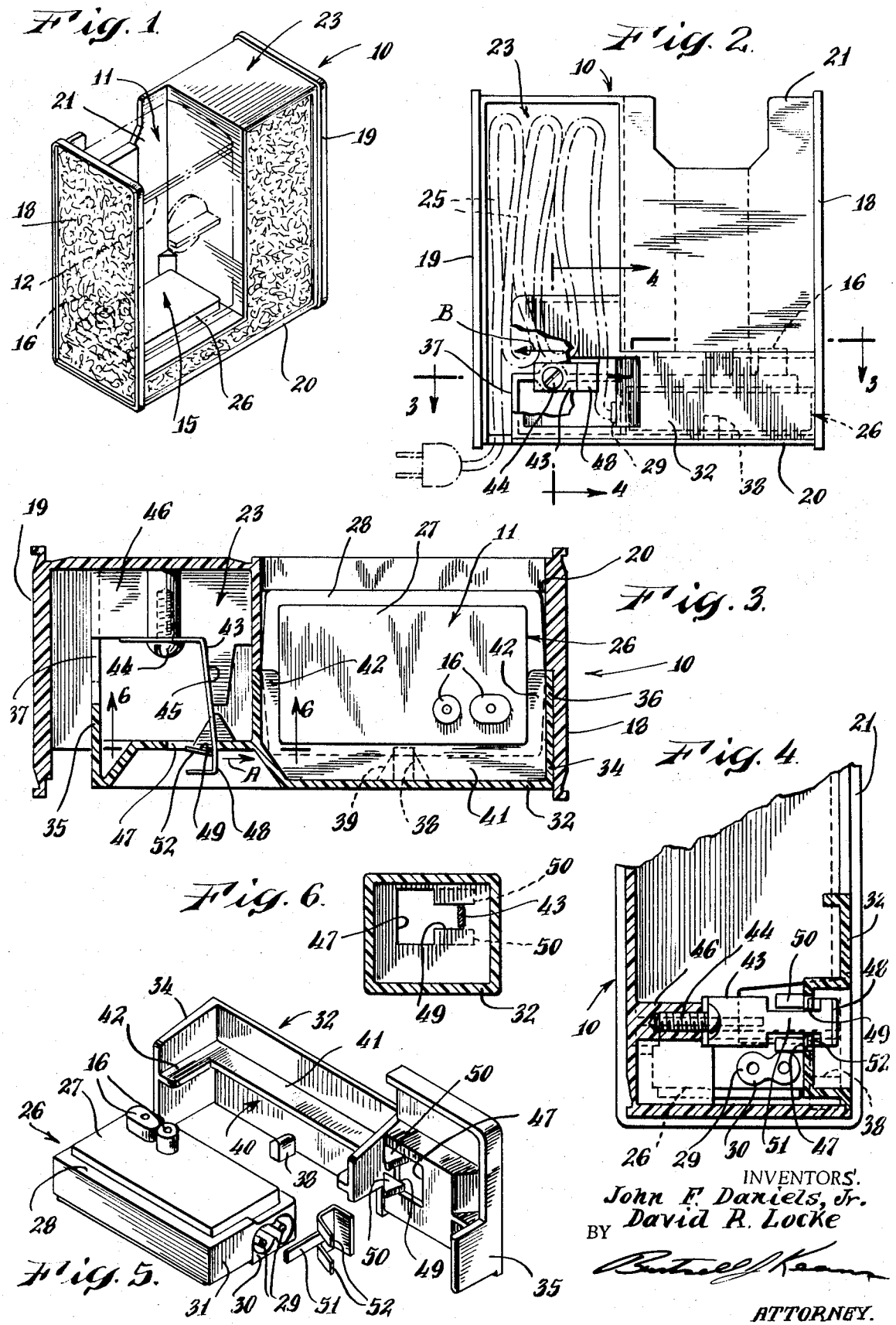

3,536,981
STORAGE AND DISPLAY UNIT
David R. Locke and John F. Daniels, Jr., Bridgeport, Conn., assignors to Sperry Rand Corporation, New York, N.Y., a corporation of Delaware
Filed Sept. 18, 1967, Ser. No. 668,526
Int. Cl. H01m 1/00
U.S. Cl. 320—2                      7 Claims

ABSTRACT OF THE DISCLOSURE

This disclosure is directed to a storage unit and charger device for a rechargeable battery operated appliance wherein the charger device is arranged in a casing separate from the storage unit and which charger casing is disposed within an appliance storage area provided in the storage unit. Means are provided on the storage unit for locating the charger casing in predetermined position in the storage unit with means provided for allowing ready removal of the positioning means whereby the charger casing is removable from the storage unit.

BACKGROUND OF INVENTION

This invention relates to new and useful improvements in storage and display units and more particularly to storage units for portable rechargeable battery operated appliances.

Storage or display units for rechargeable battery operated appliances, such as for example, electric dry shavers, which have self-contained charging means within the storage unit for replenishing the power supply of the appliance batteries, are well known. In these known storage units a storage area, such as a receptacle or the like, is provided in the storage unit for accommodating the appliance for storage or display when not in use. It is the usual practice to arrange the charging means within the storage unit casing with the output terminals of the charging means disposed in the storage receptacle for engaging input terminals on the appliance when the latter is placed therein whereby the power supply of the batteries may be replenished when the appliance is in a stored position in the receptacle.

These known storage units have been found most desirable for conveniently storing and displaying these appliances however, various problems are presented, for example, if the owner desires to take the appliance with him on a trip or to a temporary location. Since the charging means for the appliance batteries are integral with the storage unit it is necessary for the owner to take the storage unit with him in order that he will have means available for recharging the batteries when necessary. In view of the fact that these known storage units are of a greater dimension than the appliance, it has been found generally inconvenient for an owner to include the storage unit in his luggage with other articles therein due to space limitations or other reasons.

It is an object of the present invention to provide a novel storage unit and charger device for a rechargeable battery operated appliance.

Another object is to provide a novel storage unit and charger device wherein the charger device is provided in a separate casing arranged within the storage unit and which carger casing is readily removable from the storage unit.

Another object is to provide novel means for positioning and locating a charger device within a storage unit wherein means are further provided for permitting ready release of the positioning means whereby the charger device is readily removable from the storage unit for use apart from the storage unit.

The present invention contemplates a storage unit and charger means for a portable rechargeable battery operated appliance comprising a storage unit casing having a receptacle therein for accommodating the appliance for storage or display. Charger means are arranged within the receptacle for replenishing the power supply of the batteries of the appliance when in stored position. The charger means are arranged within a second casing, and detachable position means are provided on the storage unit for locating the charger casing in predetermined selected position within the receptacle. Latch means are provided for maintaining the charger casing in the predetermined position and are operable to permit release of the positioning means whereby the charger casing is readily removable from the storage unit.

The above and other objects and advantages of the present invention will appear more fully hereinafter from a consideration of the detailed description which follows taken together with the accompanying drawing wherein one embodiment of the present invention is illustrated.

In the drawing:

FIG. 1 is a perspective view of the storage unit and charger device embodying the present invention;

FIG. 2 is a rear elevational view of the device of FIG 1;

FIG. 3 is a sectional view taken on the line 3—3 of FIG. 2;

FIG. 4 is a sectional view taken on the line 4—4 of FIG. 2;

FIG. 5 is an exploded perspective view of the charger casing and a detachable wall portion of the storage unit; and FIG. 6 is a sectional view taken on the line 6—6 of FIG. 3.

Referring now to the drawing for a more detailed description of the present invention, a storage and display unit which incorporates one embodiment of the present invention is generally indicated by the reference numeral 10 in FIG. 1. Storage unit 10 includes a storage area of receptacle 11 for accommodating therein a portable rechargeable battery operated appliance such as an electric dry shaver 12 shown in broken line outline in FIG. 1. Charging means, generally indicated by the reference numeral 15 in FIG. 1 are provided at the base of receptacle 11 and which charger means 15 are provided with output terminals 16 adapted to engage input terminals (not shown) on shaver 12 in a usual manner for replenishing the power supply of the batteries within shaver 12 when the latter is in stored position in receptacle 11.

Storage unit 10 (FIGS. 1 and 2) comprises a generally box-shaped casing preferably made of premolded plastic material and which casing includes spaced end walls 18 and 19, a bottom wall 20 and a rear wall 21. A box-shaped vertical comparement 23 is provided in storage unit 10 adjacent receptacle 11 (FIGS. 1 and 2). As seen in FIG. 2, compartment 23 is open at the rear of storage unit 10 and in which compartment 23 is stored a suitable power cord 25 (shown in broken lines in FIG. 2) adapted at one end thereof for plug-in connection with charging means 15 and at the other end for plug-in connection with a usual household electrical wall outlet in a usual manner when the batteries of shaver 12 are to be recharged.

As mentioned, it is a feature of the present invention to provide novel means for mounting charging means 15 within storage unit 10 for ready removal therefrom. To this end charging means 15 comprise suitable electrical components (not shown) which are contained with a small box-shaped casing 26 (FIGS. 1, 3 and 5) disposed on bottom wall 20 of storage unit 10 within receptacle 11 (FIG. 3). The output terminals 16 of charging means 15 are arranged on a platform 27 provided on the top wall 28 of casing 26 and terminals 29 for receiving one end of the appliance cord 25 are arranged in an aperture 30 in a sidewall 31 of charger casing 26 (FIG. 5). As seen in FIG. 2 when power cord 25 is connected to terminals 29, cord 25 is extendable outwardly of storage unit 10 for connection to an electrical wall outlet.

Means are provided for maintaining charger casing 26 in position within storage unit 10 whereby platform 27 of top wall 28 of charger casing 26 serves as the base of receptacle 11 upon which shaver 12 is placed for storage or recharging. These means include an elongated wall portion 32 (FIGS. 2, 3, 4 and 5) detachably secured to storage unit 10, in a manner to be described, beneath and flush with rear wall 21 of storage unit 10. Wall portion 32 includes spaced end flanges 34 and 35 (FIGS. 3 and 5) with flange 34 disposed in a recess portion 36 (partially shown at the right in FIG. 3) formed in the inner surface of end wall 18 of unit 10. The leading edge of the opposite flange 35 abuts a projecting inner wall portion 37 (FIG. 3) of storage unit 10. A lug 38 (FIGS. 3 and 5) is formed on wall 32 and is disposed within a slot 39 provided in bottom wall 20 of storage unit 10 whereby wall 32 is located in predetermined position against storage unit 10.

A U-shaped positioning ledge portion 40 (FIGS. 3 and 4) is formed on the inner surface of wall 32 with the base 41 and arms 42 thereof arranged respectively over the rear and side peripheral edges of top wall 28 of charger casing 26 about the charging platform 27 positioning and maintaining charger casing 26 in receptacle 11.

Latching means are provided to lock wall 32 to unit 10 in the described position and which latching means include a spring member 43. Spring member 43 (FIGS. 3 and 4) has one end secured to the lower portion of rear surface of the front wall of cord compartment 23 by screw threaded fastening means 44 and which spring 43 is biased in the direction indicated by the arrow A in FIG. 3 against an edge surface 45 of an inner wall portion 46 of unit 10. The free end of spring member 43 extends through an aperture 47 in detachable wall 32 and which free end is provided with a finger grasping end portion 48. Detent means are provided on wall 32 adjacent aperture 47 and include a cut-out portion 49 (FIGS. 5 and 6) in the periphery of aperture 47 formed between a pair of spaced cam surfaces 50 projecting outwardly from the rear of wall 32. Spring 43 is provided with a midportion 51 of reduced transverse dimension which is disposed in cut-out portion 49 (FIG. 6). Fingers 52 are formed on end portion 48 of spring 43 and are biased against the outer surface of wall 32 adjacent cut-out portion 49 to lock wall 32 to storage unit 10.

If it is desired to release wall portion 32 from storage unit 10, finger grasping portion 48 is manually flexed in the direction indicated by the arrow B in FIG. 2 moving portion 51 of spring 43 out of cut-out portion 49 of aperture 47 thereby releasing fingers 52 of spring 43 from the surface of wall 32. In this flexed position of spring 43 wall 32 may then be moved away from storage unit 10. With wall 32 removed from unit 10 charger casing 26 may be withdrawn from storage unit 10 and used as a charging stand apart from storage unit 10.

When it is desired to return charger casing 26 to unit 10, casing 26 is placed in receptacle 11 from the rear of unit 10. Wall portion 32 is then aligned with unit 10 by placing flange 34 thereof adjacent recess 36 in storage unit end wall 18. Wall 32 is then moved into unit 10 with base 41 and arms 32 of ledge 40 positioning charger casing 26 at the base of receptacle 11 as wall 32 is moved into unit 10. As wall is moved inwardly cam projections 50 engage and deflect finger grasping portion 48 of spring 43 deflecting spring 43 in the direction of arrow A. As cam projections 50 clear portion 48, spring 43 is released to move mid-portion 51 into cut-out portion 49 of aperture 47 and fingers 52 into biased latching engagement with wall 32 as previously described locking wall 32 to unit 10 to maintain charger casing 26 in the previously described desired position in unit 10.

It will be apparent from the foregoing description that the novel storage unit and charger device has many advantages in use. Among other advantages the charger means is adapted for ready removal from the storage unit whereby the latter can be used apart from the storage unit thereby providing a convenient and compact charging stand for use during travelling or the like. Another advantage is that no part of the charging means is secured to the storage unit and which charging means is readily removable as unit from the storage unit thereby simplifying servicing and assembly procedure of the components thereof.

Although one embodiment of the present invention has been illustrated and described in detail, it is to be expressly understood that the invention is not limited thereto. Various changes can be made in the design and arrangement of parts without departing from the spirit and scope of the invention, as the same will now be understood by those skilled in the art.

What is claimed is:

1. A storage unit and charger means for a rechargeable battery operated appliance, comprising
   (a) a first casing having a storage area provided therein for accommodating a battery operated appliance for storage,
   (b) charger means for replenishing the power supply of the appliance disposed in a second casing arranged within said storage area of said first casing,
   (c) positioning means for locating said second casing in predetermined position within said storage area comprising a wall portion detachably mounted on said first casing and means on said wall portion extending into said storage area to position said second casing therein,
   (d) latch means for providing ready release of said wall portion from said first casing to allow for removal of said second casing from said first casing, and
   (e) said latch means including a resilient latch member secured to said first casing and adapted to engage and lock said detachable wall portion to said first casing.

2. The device of claim 1 wherein the latch means include a resilient latch member secured to said storage unit, an aperture formed in said detachable wall portion, a free end portion of said spring member extending through said aperture outwardly of said first casing and having a portion biased into engagement with the outer surface of said wall portion.

3. The device of claim 2 wherein a finger grasping portion is provided on said free end of said spring member, said spring adapted to be manually flexed clear of said wall portion to release said wall portion from said first casing.

4. The device of claim 3 wherein a cam projection is provided on the inner surface of said detachable wall portion for engaging said spring member to flex said spring member into latched engagement with said wall portion when mounted on said storage unit.

5. A storage unit and charger means for a rechargeable battery operated appliance, comprising
   (a) a first casing having a storage area provided therein for accommodating a battery operated appliance for storage,
   (b) charger means for replenishing the power supply of the appliance disposed in a second casing arranged within said storage area of said first casing,
   (c) said storage area comprising a receptacle provided in said first casing, said second casing disposed in said receptacle to provide a base for said receptacle,
   (d) positioning means detachably mounted on said first casing for locating said second casing in predetermined position within said storage area, (e) said positioning means including a wall portion detachably secured to said first casing and having a portion extending into said receptacle to position said second casing therein, and (f) latch means for providing ready release of said positioning means from said first casing to allow for removal of said second casing from said first casing.

6. The device of claim 5 wherein said first casing includes a box-shaped body portion having spaced end walls, bottom wall and rear wall, said receptacle comprising a recessed portion in said body portion intermediate said end walls, said detachable wall portion being secured to said body portion flush with said rear wall and disposed between said rear wall and bottom wall, and said second casing disposed on said bottom wall at the base of said receptacle.

7. The device of claim 6 wherein said charger casing includes a top wall, charger output terminals on said top wall arranged in said receptacle, and said positioning portion on said detachable wall comprising a U-shaped flange portion arranged over side and rear marginal portions of said charger casing.

References Cited

UNITED STATES PATENTS

| | | | |
|---|---|---|---|
| 3,287,076 | 11/1966 | Spofford | 320—2 X |
| 3,371,260 | 2/1968 | Jackson et al. | 320—2 |
| 3,379,952 | 4/1968 | Tarrson | 320—2 |
| 3,390,319 | 6/1968 | Robison | 320—2 |
| 3,448,365 | 6/1969 | Jacobson | 320—2 |

J. D. MILLER, Primary Examiner

J. M. GUNTHER, Assistant Examiner

U.S. Cl. X.R.

312—206